United States Patent Office 3,091,424
Patented May 28, 1963

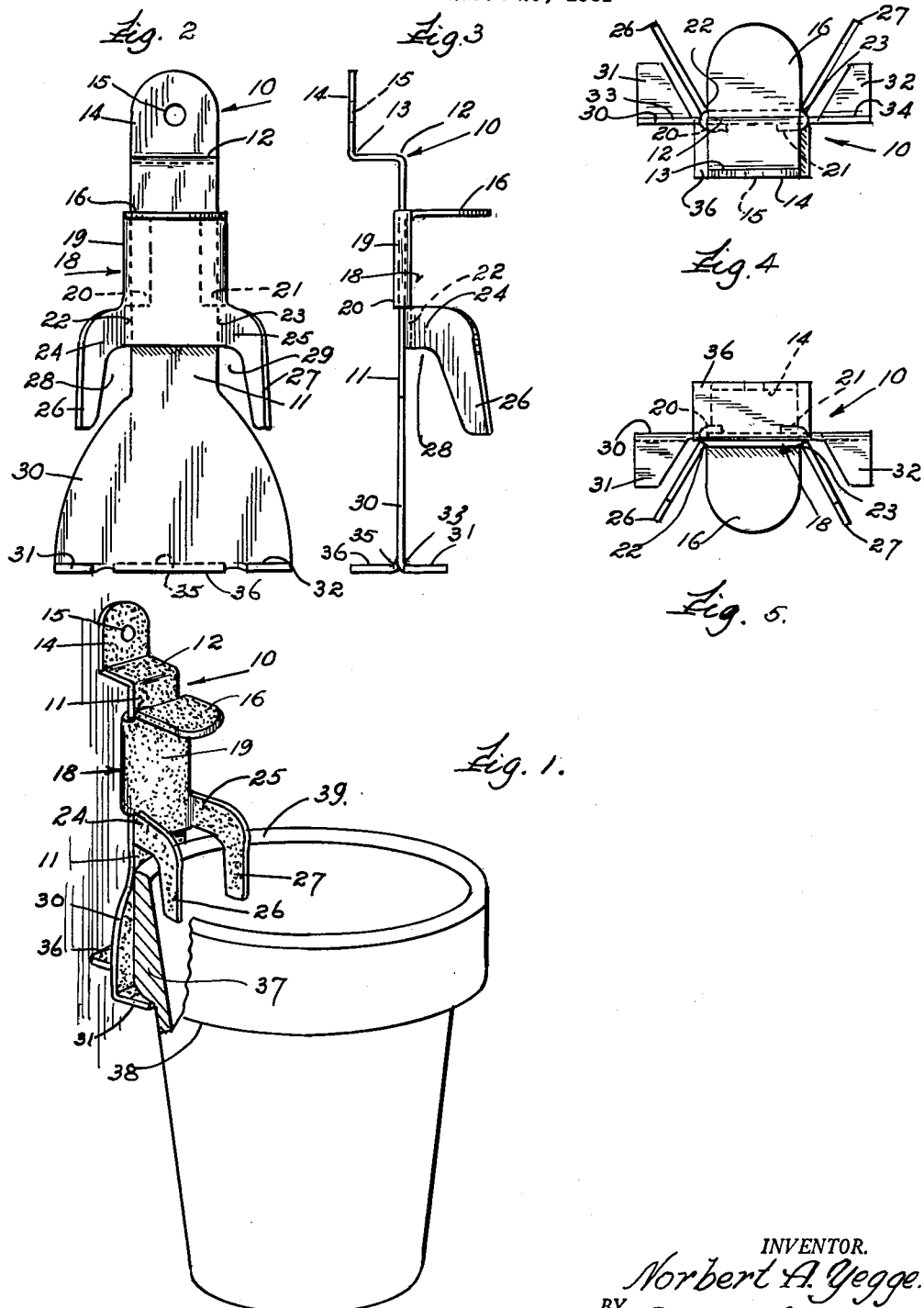

3,091,424
WALL BRACKET FOR FLOWER POTS
Norbert A. Yegge, 409 Main St., McHenry, Ill.
Filed Mar. 28, 1961, Ser. No. 98,807
1 Claim. (Cl. 248—313)

The present invention relates to wall brackets for flower pots, and is particularly concerned with the provision of an improved assembly whereby a conventional flower pot may be safely supported from a wall or other vertical member.

One of the objects of the invention is the provision of an improved flower pot and bracket assembly by means of which a conventional flower pot may be held in vertical position and in spaced relation to a wall or other structural member in a safe and stable condition with the flower pot in vertical position, with a minimum number of fastening members driven into the wall.

Another object of the invention is the provision of an improved flower pot supporting bracket which is provided with a pair of widely spaced forwardly extending flanges for engaging beneath an annular shoulder carried by the upper part of the flower pot and with a sliding member having a pair of forwardly and downwardly extending fingers which engage over and into the flower pot and hold it without any possibility of its being released.

Another object of the invention is the provision of an improved flower pot holding bracket which is simple in construction, which has a minimum number of parts, which is positive in its action, which holds the flower pot very securely against any possibility of its release, and which may be manufactured at a very low cost so that it may be purchased by a large number of the public.

Other objects and advantages of the invention will be apparent from the following description and the accompanying drawings, in which similar characters of reference indicate similar parts throughout the several views.

Referring to the single sheet of drawings accompanying this specification,

FIG. 1 is a view in perspective of the bracket and flower pot assembly embodying the invention;

FIG. 2 is a front elevational view of the bracket;

FIG. 3 is a side elevational view of the bracket;

FIG. 4 is a top plan view of the bracket;

FIG. 5 is a bottom plan view of the bracket.

Referring to the drawings, 10 indicates the flower pot supporting bracket in its entirety; and this bracket preferably comprises a body 11 having parallel edges, and constructed of sheet metal or other rigid material for slidably mounting a slider, indicated at 18.

The body 11 is bent at right angles at 12 and again bent upwardly at 13 to provide an offset between the bends 12 and 13 for spacing the body 11 from the wall or other structural member to which it is intended to be secured by the upper supporting flange 14, having an aperture 15 for receiving a nail or screw, which is driven into the wall.

At its lower end the body 11 is provided with a laterally enlarged portion 30, which supports two forwardly extending flanges or lugs 31, 32 and a backwardly extending flange 36.

The end portions 31, 32 of the enlargement 30 are bent forwardly at right angles at 31; and the central flange 36 is bent backwardly at 35 to space the body from the wall.

The flanges 31, 32 are adapted to engage under the annular shoulder 38, which is carried by the flower pot, as shown in FIG. 1, below its top edge 39. The flanges 31, 32 are tapered on their inner sides, and are thus adapted to receive the curved body of the flower pot between them, while engaging below the annular flange 38 at widely spaced points, thus insuring lateral stability.

The body 11 slidably supports a slider 18, which is in the form of a keeper, for securing the flower pot on the bracket. Thus the slider 18 has a rectangular body, which is bent backwardly around the body 11 of the bracket, and has two flanges 20, 21 on the back of the body 11, forming guides for permitting it to slide on the body 11.

At its upper end the slider 18 has a forwardly extending flange 16, serving as a thumb piece for engagement with the fingers in moving the slider up or down. At its lower end the slider 18 has a pair of forwardly extending flanges 24, 25, which are bent at an obtuse angle 22, 23 to the body so that they spread from each other.

These spreading flanges have downwardly extending fingers 26, 27 separated from the body 11 by vertical slots 28, 29, which are adapted to receive the upper collar of the flower pot, as shown in FIG. 1.

The length of the body 11 of the bracket is preferably such that the slider may slide upward until the fingers 26, 27 clear the top 39 of the flower pot to effect its release.

The fingers 26, 27 are preferably tapered on their rear edges so that they may draw the flower pot tightly against the bracket and prevent any possibility of its accidental release.

The taper on the rear edges of the fingers 26, 27 provides the upwardly extending slots 28, 29 with an upward taper and adapts these slots 28, 29 to receive flower pots of varying diameter. Both large and small flower pots of different diameters are engaged by the fingers 26, 27 and held firmly by the bracket.

It will thus be observed that I have invented an improved flower pot supporting bracket and flower pot bracket assembly which engages the flower pot at widely spaced points above and below, thus insuring a more stable securement of the flower pot.

The present bracket holds the flower pot in spaced relation to the wall and may be used for attachment to the wall or to any other structural member so that flowers may be located in various attractive positions.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desired to secure by Letters Patent of the United States, is:

A wall bracket for flower pots of the type having a conical body, an inner frusto-conical surface, and an outer annular cylindrical collar at the top having a lower outer annular shoulder, comprising a sheet metal body having an upper narrow portion of uniform width and a lower laterally enlarged end portion for engaging the flower pot at widely spaced points, said enlarged portion having at its lower front end a pair of forwardly bent supporting flanges at right angles to the body for engaging below said annular shoulder, said supporting flanges being tapered forwardly on their inner sides to permit the conical body to be received between the tapered portion of said flanges when said flanges engage below said annular shoulder to support the pot, said body also having at its lower end a lower backwardly bent right angle flange, between said tapered supporting flanges and adapted to engage a wall on which the bracket is mounted, said body also having at its upper end a backwardly turned right angle flange for spacing the body from the wall a distance equal to the length of the lower right angle flange, said body also having an upwardly extending tab at its end with an aperture for a supporting nail or the like, and a sheet metal slider mounted slidably on said narrow portion, and comprising a slider body provided with a pair of guide flanges, one on each side of the slider body extending backwardly, and said guide flanges being bent toward each other to retain the slider on the narrow portion, said slider having at its lower end a pair of diagonally, laterally, and downwardly extending fingers, said fingers extending downwardly at a point forwardly of the enlarged portion of said body, and being tapered downwardly on their rear sides to cause the fingers to fit against the inner frustoconical surface of the pot at its upper end to retain the pot on the bracket against any movement.

References Cited in the file of this patent

UNITED STATES PATENTS

| | | |
|---|---|---|
| 1,446,036 | Dodd | Feb. 20, 1923 |
| 1,848,430 | Morris | Mar. 8, 1932 |
| 2,427,416 | Petersen | Sept. 16, 1947 |
| 2,504,583 | Rachic | Apr. 18, 1950 |
| 2,764,384 | Kirsch | Sept. 25, 1956 |
| 2,967,691 | Lehnbeuter | Jan. 10, 1961 |